United States Patent [19]

Katznelson et al.

[11] Patent Number: 4,736,420

[45] Date of Patent: Apr. 5, 1988

[54] VIDEO SCRAMBLING BY SEGMENTING VIDEO INFORMATION LINES

[75] Inventors: Ron D. Katznelson, San Diego; Gordon K. Walker, Carlsbad; Paul Moroney, Cardiff-by-the-Sea, all of Calif.

[73] Assignees: M/A-COm Government Systems, Inc.; Cable/Home Communication Corp., both of San Diego, Calif.

[21] Appl. No.: 909,763

[22] Filed: Sep. 19, 1986

[51] Int. Cl.$^4$ ............................................. H04N 7/167
[52] U.S. Cl. .......................................... 380/11; 380/14; 380/20
[58] Field of Search ........................ 380/10, 11, 20, 14

[56] References Cited

U.S. PATENT DOCUMENTS

| 2,912,486 | 11/1959 | Shanahan . | |
|---|---|---|---|
| 2,972,008 | 2/1961 | Ridenour et al. | 178/5.1 |
| 4,070,693 | 1/1978 | Shutterly | 358/123 |
| 4,458,268 | 7/1984 | Ciciora | 358/120 |
| 4,563,702 | 1/1986 | Heller et al. | 358/119 |
| 4,594,609 | 6/1986 | Romao et al. | 380/11 X |

FOREIGN PATENT DOCUMENTS

| 83303875.5 | 1/1984 | European Pat.Off. . | |
|---|---|---|---|
| 0123422 | 10/1984 | European Pat. Off. | 380/11 |
| 2330236 | 11/1975 | France . | |
| 2431809 | 7/1978 | France . | |
| 2113940 | 8/1983 | United Kingdom | 380/11 |

OTHER PUBLICATIONS

Bhaskaran and Davidov, "Video Scrambling—An Overview", 1984 NCTA Technical Papers, pp. 240-246.

Baxes, "Digital Technique Cures Line Segmentation Scrambling Problems", 1985 NCTA Technical Papers, pp. 308-313.

Jeffers et al., "Hard Encrypted Video and Audio Television System", 1986 NCTA Technical Papers, pp. 232-234.

Primary Examiner—Stephen C. Buczinski
Assistant Examiner—Linda J. Wallace
Attorney, Agent, or Firm—Edward W. Callan

[57] ABSTRACT

A system for scrambling a video signal having a plurality of horizontal lines, each of which includes a video information portion and a non-video information portion. The scrambling system includes a memory; means for storing the video information portion of each video signal line in the memory; and means for forming scrambled horizontal lines by retrieving each of a plurality of said stored video information lines in a plurality of segments preceded by a non-video segment and separated by non-video segment(s). The retrieval means include means for varying the respective durations of the retrieved video information segments in individual scrambled horizontal lines in accordance with an encryption keystream; and means for varying the total duration of the non-video segments for individual scrambled horizontal lines in accordance with a predetermined timing pattern. A complementary descrambling system also is disclosed.

20 Claims, 3 Drawing Sheets

VIDEO SCRAMBLING BY SEGMENTING VIDEO INFORMATION LINES

BACKGROUND OF THE INVENTION

The present invention generally pertains to television and is particularly directed to video signal scrambling.

SUMMARY OF THE INVENTION

The present invention provides a system for scrambling a video signal having a plurality of horizontal lines, each of which includes a video information portion and a non-video information portion. The scrambling system of the present invention includes a memory; means for storing the video information portion of each video signal line in the memory; and means for forming scrambled horizontal lines by retrieving each of a plurality of said stored video information lines in a plurality of segments preceded by a non-video segment and separated by non-video segment(s). The retrieval means include means for varying the respective durations of the retrieved video information segments in individual scrambled horizontal lines; and means for varying the total duration of the non-video segments for individual scrambled horizontal lines.

The present invention further provides a system for descrambling a scrambled video signal having a plurality of horizontal lines, each of which includes a segmented video information portion preceded by a non-video segment and separated by non-video segment(s), with the respective durations of the video information segments in an individual scrambled horizontal line being different for different individual scrambled lines, and with the total duration of the non-video segments in an individual scrambled horizontal line being different for different individual scrambled lines. The descrambling system includes a memory; means for storing the video information segments of each scrambled horizontal line in the memory; and means for forming descrambled horizontal lines by retrieving the stored video information segments of each line in a nonsegmented format. The storage means include means for storing the video information segments in accordance with the variation in the respective durations of the video information segments in different individual scrambled horizontal lines and the variation in the total duration of the non-video segments in different individual scrambled lines.

Additional features of the present invention are described with reference to the description of the preferred embodiment.

DESCRIPTION OF THE PREFERRED EMBODIMENTS

Figure 1:
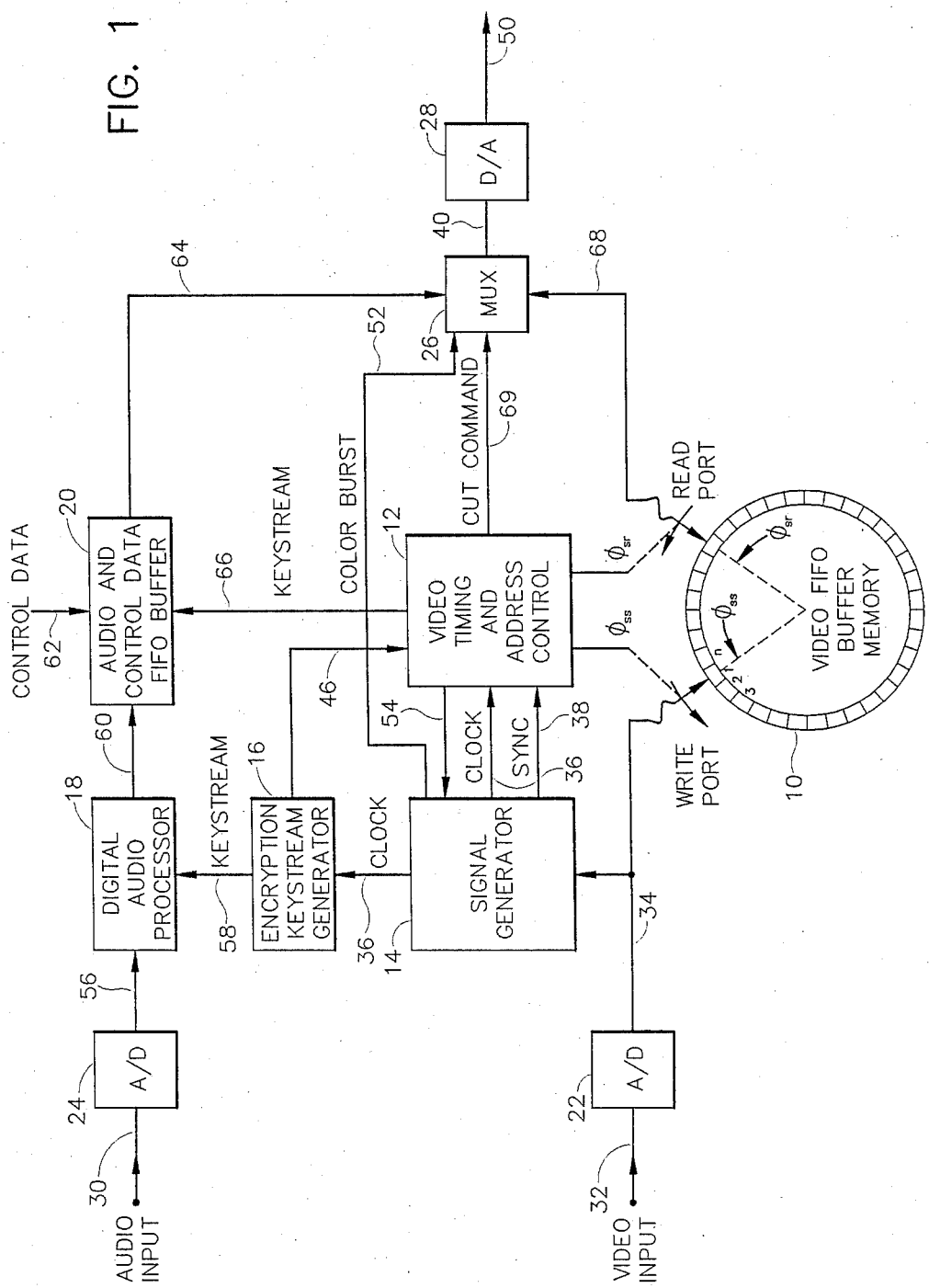
FIG. 1 is a block diagram of the scrambling system of the present invention.

Referring to FIG. 1, a preferred embodiment of the scrambling system of the present invention includes a video FIFO (first-in, first-out) buffer memory 10, a timing and address control unit 12, a signal generator 14, an encryption keystream generator 16, a digital audio processor 18, an audio and control data FIFO buffer memory 20, a video analog-to digital (A/D) converter 22, an audio A/D converter 24, a multiplexer (MUX) 26 and a digital-to-analog (D/A) converter 28.

The scrambling system receives an audio input signal 30 and a video input signal 32. The video input signal 32 is a standard format video signal, having a plurality of horizontal lines, each of which includes a video information portion and a non-video information portion. The A/D converter 22 converts the video input signal 32 into a digital video signal 34 having video and non-video information portions corresponding to the like portions of the video input signal 32.

Figure 2:
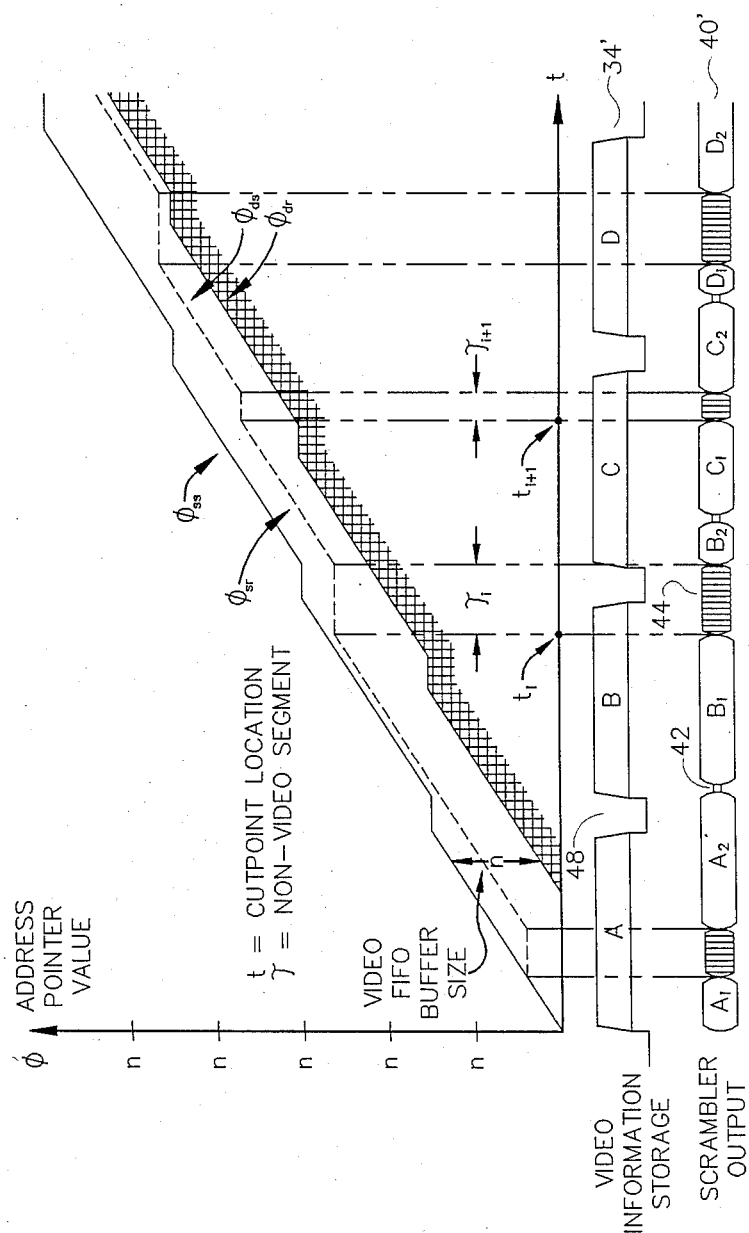
FIG. 2 is a combined memory address pointer and timing diagram for the scrambling system of FIG. 1.

Only the video information portions of the digital video signal 34 are stored in the memory 10, as depicted by portions A, B, C, D, of waveform 34' in FIG. 2. Each video information portion A, B, C, D, contains the video information for an individual horizontal line. The digital video information portion for each horizontal line includes "m" blocks of digital video information.

The video timing and address control unit 12 controls the storage of the video information portions of the digital signal in the memory 10. The control unit 12 provides a scrambler store address pointer value $\phi_{ss}$ for sequentially addressing n consecutive storage locations in the memory 10 for sequentially storing the m individual blocks of the video information portion of each horizontal line.

The timing of such storage is controlled by the control unit 12 in accordance with a clock signal 36 and a sync signal 38 provided by the signal generator 14 in response to sync and timing data received by the signal generator 14 from the digital video input signal 34.

The video signal is scrambled by retrieving each stored video information line in a plurality of segments, such as B1, B2 of waveform 40' in FIG. 2, preceded by a non-video segment 42, and separated by one or more non-video segment(s) 44.

The video timing and address control unit 12 controls the segmented retrieval of the video information portions from the memory 10. The control unit 12 provides a scrambler retrieve address pointer value $\phi_{sr}$ for sequentially addressing the n storage locations in the memory 10 for sequentially retrieving the m individual blocks of the video information portion of each horizontal line.

The timing of such retrieval is controlled by the control unit 12 in accordance with the clock signal 36 from the signal generator 14, an encryption keystream 46 from the encryption keystream generator 16 and a predetermined timing pattern stored in the control unit 12. The control unit 12 varies the respective durations of the retrieved video information segments A1, A2; B1, B2; C1, C2; D1, D2 in individual retrieved lines by varying the cut-point for segmenting the stored video information portion A, B, C, D of each video line for retrieval in accordance with the encryption keystream 46. The encryption keystream generator 16 is clocked by the same clock signal 36 as the control unit 12.

The control unit 12 further varies the total duration of the non-video segments for individual horizontal lines, such as segments 42 and 44 for line B (B1 +B2) in waveform 40', in accordance with the stored predetermined timing pattern. For an entire video field of horizontal lines, the average total duration of the non-video segments equals the duration of the non-video segment 48 in an unscrambled video signal (waveform 34' in FIG. 2). In the preferred embodiment, only the duration of the non-video segment positioned between the video information segments for the same line, such as segment 44, is varied. In other embodiments, the duration of the non-video segment preceding the video information segments, such as segment 42, also may be varied.

Retrieval of blocks of a given stored video line from the FIFO memory 10 commences before storage of the given video line is completed. FIG. 2 illustrates the timing relationship between the storage and retrieval of the video information for the different video lines A, B, C, D and the values of the address pointers $\phi_{ss}$ and $\phi_{sr}$ used respectively for such storage and retrieval. Note that the scale for the address pointer value $\phi$ in the memory address pointer portion of FIG. 2 is a modulo-n scale. The use of FIFO buffer memory 10 enables the number of storage locations "n" to be less than the number of individual blocks of video information "m" that are stored for each horizontal video line.

The scrambled output signal from the scrambling system of FIG. 1 further includes color burst information and audio information and control data.

A color burst information signal 52 is generated by the signal generator 14 in accordance with the sync and timing information received from the digital video input signal 34. The timing of the color burst signal 52 is controlled by a timing signal 54 provided by the control unit 12 in accordance with the stored predetermined timing pattern to cause the color burst signal 52 to be multiplexed by the MUX 26 with segmented video information 68 retrieved from the video memory 10 so as to be inserted in the non-video segment that precedes each retrieved line of video information, such as by insertion in the non-video segment 42 preceding retrieved video information segment B1.

The audio input signal 30 is converted to a digital audio signal 56 by the D/A converter 24. The digital audio processor 18 compresses the digital audio signal 56 and also scrambles the compressed audio signal in accordance with an encryption keystream 58 from the encryption keystream generator 16. The compressed and scrambled digital audio signal is further processed for error conditioning. Audio information 60 from the digital audio processor 18 is stored in the FIFO buffer memory 20 together with control data 62. The combined audio information and control data 64 are retrieved from the FIFO memory 20 at times prescribed by a control signal 66 provided from the control unit 12 in accordance with the encryption keystream 46 and the predetermined timing pattern to cause the audio information and control data 62 to be multiplexed by the MUX 26 with segmented video information 68 retrieved from the video memory 10 so as to be inserted in the non-video segment between the segmented portions of the retrieved video information, such as by insertion in non-video segment 44 between retrieved video information portions B1 and B2. The MUX 26 receives a cut command 69 from the video timing and address control unit 12.

The multiplexer provides a composite signal 40, as depicted by waveform 40' in FIG. 2. The composite signal is converted to an analog signal by the D/A converter 28 to provide the scrambled output signal 50.

Figure 3:
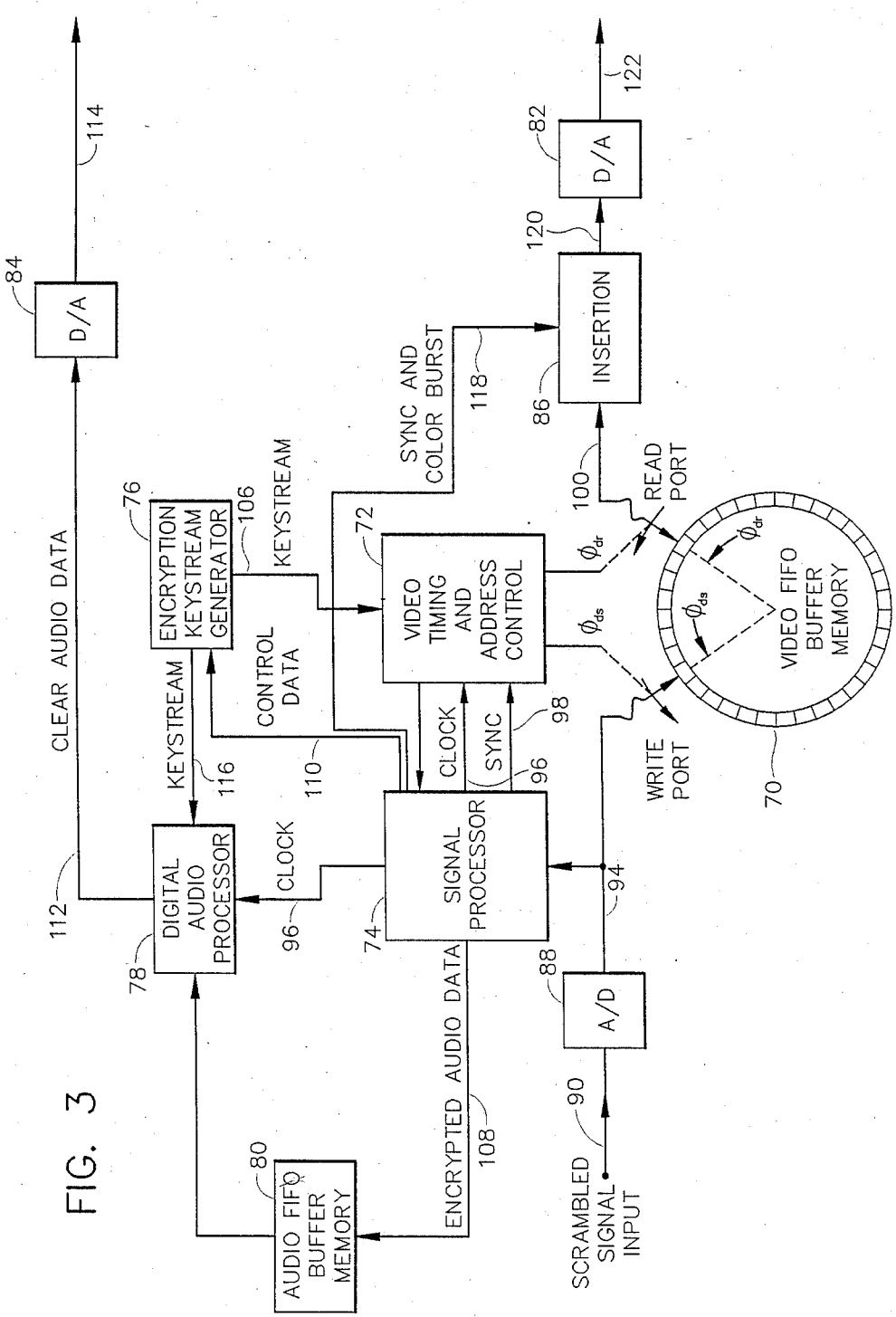
FIG. 3 is a block diagram of the descrambling system of the present invention.

Referring to FIG. 3, a preferred embodiment of the descrambling system of the present invention includes a video FIFO buffer memory 70, a timing and address control unit 72, a signal processor 74, an encryption keystream generator 76, a digital audio processor 78, an audio FIFO buffer memory 80, a video D/A converter 82, an audio D/A converter 84, a signal insertion unit 86 and an A/D converter 88.

The descrambling system receives a scrambled input signal 90. The A/D converter 88 converts the scrambled input signal 90 into a digital signal 94 having video and non-video segments corresponding to the like portions of the scrambled digital signal 50 provided in the scrambling system of FIG. 1.

Only the video information segments of the digital signal 94 are stored in the memory 70.

The video timing and address control unit 72 controls the storage of the video information portions of the digital signal 94 in the memory 70. The control unit 72 provides a descrambler store address pointer value $\phi_{ds}$ for sequentially addressing n consecutive storage locations in the memory 70 for sequentially storing the m individual blocks of the combined video information segments of each horizontal line.

The addressing of such storage in the memory 70 is timed by the control unit 72 in accordance with a clock signal 96 and a sync signal 98 from the signal processor 74, an encryption keystream 106 from the encryption keystream generator 76 and a predetermined timing pattern stored in the control unit 72. The control unit 72 accounts for the variation in the respective durations of the retrieved video information segments in individual retrieved lines and for the variation of the total duration of the non-video segments for individual lines by timing the store address pointer value $\phi_{ds}$ in in accordance with both the encryption keystream 76 and the stored predetermined timing pattern. The encryption keystream generator 76 is clocked by the same clock signal 96 as the control unit 72.

The video signal is descrambled by retrieving the stored video information segments to form a standard format video signal 100, having a plurality of horizontal lines, each of which includes a video information portion and a non-video information portion.

The video timing and address control unit 72 controls the retrieval of the video information segments from the memory 70. The control unit 72 provides a descrambler retrieve address pointer value $\phi_{dr}$ for sequentially addressing the n storage locations in the memory 70 for sequentially retrieving the m individual blocks of the video information portion of each horizontal line.

The timing of such retrieval is controlled by the control unit 72 in accordance with the clock signal 96 and the sync signal 98 provided by the signal processor 74. The clock signal 96 and the sync signal 98 are provided by the signal processor 74 in response to sync and timing data received by the signal processor 74 from the color burst information and vertical reference data in the scrambled digital input signal 94.

FIG. 2 illustrates the timing relationship between the storage and retrieval of the video information for the different video lines A, B, C, D and the values of the address pointers $\phi_{ds}$ and $\phi_{dr}$ used respectively for such storage and retrieval. Note that the store address pointer $\phi_{ds}$ of the descrambling system of FIG. 3 tracks the retrieve address pointer $\phi_{sr}$ of the scrambling system of FIG. 1.

The signal processor 74 extracts scrambled audio information 108 and control data 110 from the scrambled digital input signal 94.

The extracted scrambled audio information 108 is buffered in the FIFO memory 80 and then descrambled and otherwise processed the the digital audio processor 78 to provide a digital audio signal 112, which is converted into an analog audio output signal 114 by the D/A converter 84. The digital audio processor 78 is clocked by the clock signal 96 from the signal processor 74, and descrambles the scrambled audio signal in accordance with an encryption keystream 116 generated by the encryption keystream processor 76. The extracted control data 110 is used to control the encryption keystream generator 76.

The signal processor 74 also generates color burst and sync information signals 118 that are inserted by the signal insertion unit 86 into the non-video segment preceding the video information portion of each descrambled video signal 100 to provide a composite descrambled digital video signal 120. The composite digital signal 120 is converted by the D/A converter 82 into a standard format analog video output signal 122.

We claim:

1. A system for scrambling a video signal having a plurality of horizontal lines, each of which includes a video information portion and a non-video information portion, comprising
   a memory;
   means for storing the video information portion of each video signal line in the memory; and
   means for forming scrambled horizontal lines by retrieving each of a plurality of said stored video information lines in a plurality of segments preceded by a non-video segment and separated by non-video segment(s);
   wherein the retrieval means include
   means for varying the respective durations of the retrieved video information segments in individual scrambled horizontal lines; and
   means for varying the total duration of the non-video segments for individual scrambled horizontal lines.

2. A system according to claim 1 wherein the retrieval means vary the respective durations of the retrieved video information segments in accordance with an encryption keystream.

3. A system according to claim 2, wherein the retrieval means vary the total duration of the non-video segments in individual scrambled lines in accordance with a predetermined pattern.

4. A system for descrambling a scrambled video signal having a plurality of horizontal lines, each of which includes a segmented video information portion preceded by a non-video segment, with the video information segments in an individual scrambled horizontal line being separated by non-video segment(s), and with the respective durations of the video information segments in an individual scrambled horizontal line being different for different individual scrambled lines, and with the total duration of the plurality of non-video segments in an individual scrambled horizontal line being different for different individual scrambled lines, the system comprising
   a memory;
   means for storing the video information segments of each scrambled horizontal line in the memory; and
   means for forming descrambled horizontal lines by retrieving the stored video information segments of each line in a nonsegmented format;
   wherein the storage means include means for storing the video information segments in accordance with the variation in the respective durations of the video information segments in different individual scrambled horizontal lines and the variation in the total duration of the plurality of non-video segments in different individual scrambled lines.

5. A system according to claim 4 wherein
   the variation in the respective durations of the video information segments in different individual scrambled horizontal lines is in accordance with an encryption keystream,
   the storage means store the video information segments in accordance with the encryption keystream.

6. A system according to claim 5, wherein
   the variation in the total duration of the non-video segments in different individual scrambled lines is in accordance with a predetermined pattern; and
   the storage means further store the video line segments in accordance with said predetermined pattern.

7. A system according to claim 4,
   wherein the video information portion of each horizontal line includes m blocks of video information;
   wherein the means for storing said video information portions of each horizontal line in the memory includes means for providing a descrambler store address pointer value for sequentially addressing n consecutive storage locations in the memory for sequentially storing the m individual blocks of the video information portion of each horizontal line; and
   wherein the means for retrieving said video information portions of each horizontal line includes means for providing a descrambler retrieve address pointer value for sequentially addressing the n storage locations in the memory for sequentially retrieving the m individual blocks of the video information portion of each horizontal line.

8. A system according to claim 7, wherein the retrieving means commences said retrieval of information portions of a given horizontal line before the storage means completes storing the information portions of said given horizontal line.

9. A system according to claim 8, wherein the memory is a FIFO buffer memory, thereby enabling the number of storage locations n to be less than the number of individual blocks of video information m that are stored for each horizontal line.

10. A system according to claim 7, wherein the memory is a FIFO buffer memory, thereby enabling the number of storage locations n to be less than the number of individual blocks of video information m that are stored for each horizontal line.

11. A system according to claim 1,
    wherein the video information portion of each horizontal line includes m blocks of video information;
    wherein the means for storing said video information portions of each horizontal line in the memory includes means for providing a scrambler store address pointer value for sequentially addressing n consecutive storage locations in the memory for sequentially storing the m individual blocks of the video information portion of each horizontal line; and
    wherein the means for retrieving said video information portions of each horizontal line includes means for providing a scrambler retrieve address pointer value for sequentially addressing the n storage locations in the memory for sequentially retrieving the m individual blocks of the video information portion of each horizontal line.

12. A system according to claim 11, wherein the retrieving means commences said retrieval of information portions of a given horizontal line before the storage means completes storing the information portions of said given horizontal line.

13. A system according to claim 12, wherein the memory is a FIFO buffer memory, thereby enabling the number of storage locations n to be less than the number of individual blocks of video information m that are stored for each horizontal line.

14. A system according to claim 11, wherein the memory is a FIFO buffer memory, thereby enabling the number of storage locations n to be less than the number of individual blocks of video information m that are stored for each horizontal line.

15. A system comprising
a scrambler for scrambling a video signal to provide a scrambled video signal having a plurality of horizontal lines, each of which includes a segmented video information portion preceded by a non-video segment, with the video information segments in an individual scrambled horizontal line being separated by non-video segment(s), and with the respective durations of the video information segments in an individual scrambled horizontal line being different for different individual scrambled lines, and with the total duration of the plurality of non-video segments in an individual scrambled horizontal line being different for different individual scrambled lines; and
a descrambler for descrambling said scrambled video signal, the descrambler comprising
a memory;
means for storing the video information segments of each scrambled horizontal line in the memory; and
means for forming descrambled horizontal lines by retrieving the stored video information segments of each line in a nonsegmented format;
wherein the storage means include means for storing the video information segments in accordance with the variation in the respective durations of the video information segments in different individual scrambled horizontal lines and the variation in the total duration of the plurality of non-video segments in different individual scrambled lines.

16. A system according to claim 15, wherein
the variation in the respective durations of the video information segments in different individual scrambled horizontal lines is in accordance with an encryption keystream; and
the storage means store the video information segments in accordance with the encryption keystream.

17. A system according to claim 16, wherein
the variation in the total duration of the non-video segments in different scrambled lines is in accordance with a predetermined pattern; and
the storage means further store the video line segments in accordance with said predetermined pattern.

18. A system according to claim 15,
wherein the video information portion of each horizontal line includes m blocks of video information;
wherein the means for storing said video information portions of each horizontal line in the memory includes means for providing a descrambler store address pointer value for sequentially addressing n consecutive storage locations in the memory for sequentially storing the m individual blocks of the video information portion of each horizontal line; and
wherein the means for retrieving said video information portions of each horizontal line includes means for providing a descrambler retrieve address pointer value for sequentially addressing the n storage locations in the memory for sequentially retrieving the m individual blocks of the video information portion of each horizontal line.

19. A system according to claim 18, wherein the retrieving means commences said retrieval of information portions of a given horizontal line before the storage means completes storing the information portions of said given horizontal line.

20. A system according to claim 18, wherein the memory is a FIFO buffer memory, thereby enabling the number of storage locations n to be less than the number of individual blocks of video information m that are stored for each horizontal line.

* * * * *